United States Patent

[11] 3,623,579

| [72] | Inventors | Paul G. Hendrickson<br>Ann Arbor;<br>Earl W. Elster, Allen Park, both of Mich. |
|------|-----------|--------|
| [21] | Appl. No. | 861,321 |
| [22] | Filed | Sept. 26, 1969 |
| [45] | Patented | Nov. 30, 1971 |
| [73] | Assignee | Kelsey-Hayes Company |

[54] FABRICATED ROTOR FOR A DISK BRAKE ASSEMBLY
4 Claims, 5 Drawing Figs.

[52] U.S. Cl. ........................................... 188/218 XL,
188/71.6, 188/73.2, 188/251 M, 188/264 AA,
192/107 R, 192/113 A
[51] Int. Cl. ......................................... F16d 65/12
[50] Field of Search........................................... 188/71.6,
73.1, 73.2, 251 M, 264 A, 264 AA, 218 XL;
192/107 R, 107 C, 113 A

[56] References Cited
UNITED STATES PATENTS

| 2,262,709 | 11/1941 | Lambert | 192/113 A UX |
| 2,850,118 | 9/1958 | Byers | 188/251 M X |
| 3,486,218 | 12/1969 | Buyze | 192/107 X |

*Primary Examiner*—George E. A. Halvosa
*Attorney*—Harness, Dickey & Pierce

ABSTRACT: A disk brake assembly embodying a ventilated, fabricated rotor. The rotor is made up of three formed pieces. The first two pieces form oppositely facing annular braking surfaces and the third piece is corrugated, holds the other two pieces together and forms with these pieces a number of radially extending cooling air gaps.

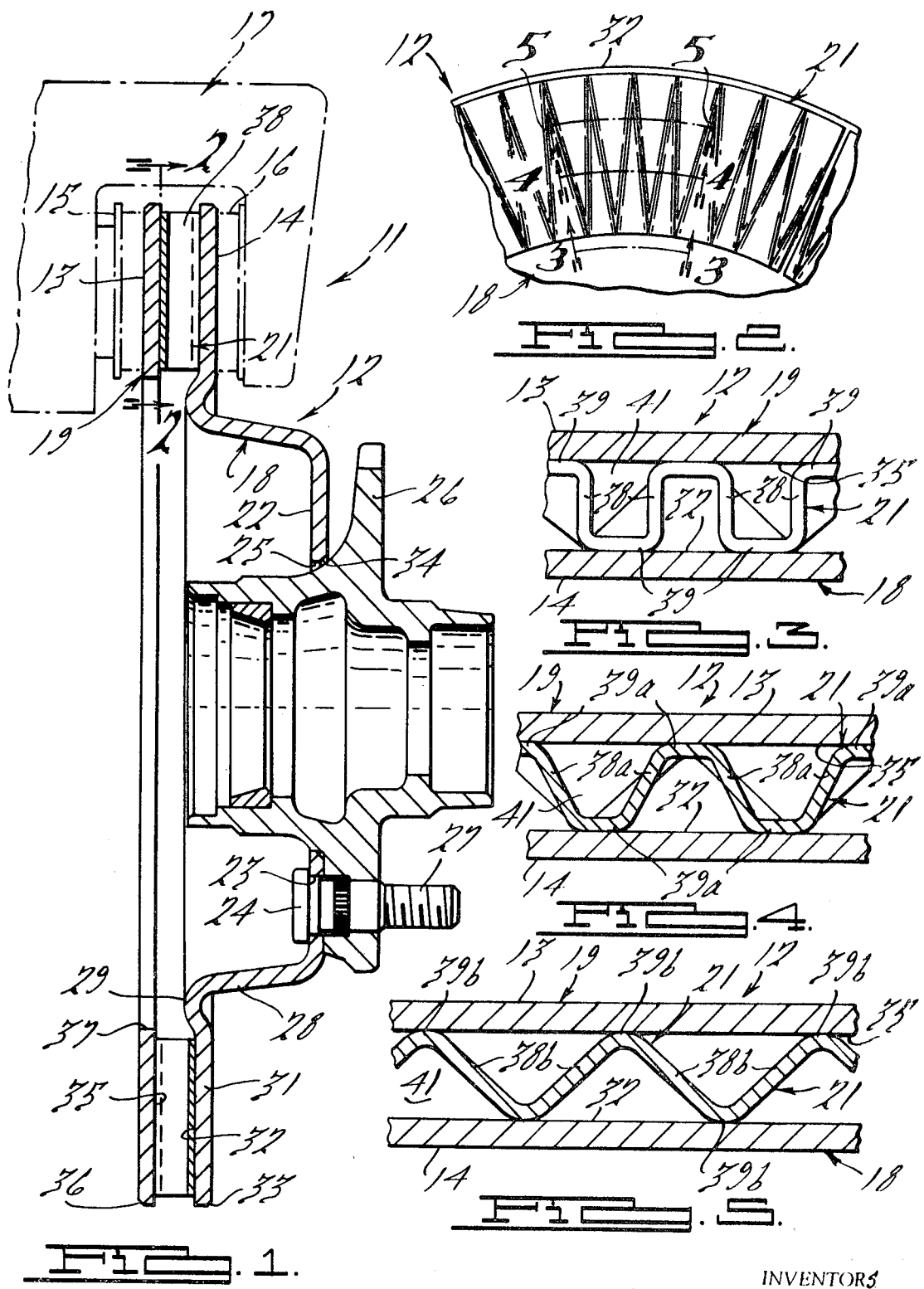

3,623,579

1

FABRICATED ROTOR FOR A DISK BRAKE ASSEMBLY

BACKGROUND OF THE INVENTION

This invention relates to a disk brake assembly and more particularly to a fabricated rotor or disk for such a brake. Automotive disk brakes are meeting with a wide range of acceptance. Such brakes embody a disk or rotor that is affixed for rotation with the vehicle wheel and which is engaged by brakeshoes or pads for braking. These rotors have, heretofore, been formed as castings. Castings have several defects in such an application. A casting is generally heavier than a fabricated steel assembly of the same strength and since the rotor is normally a part of the unsprung mass of the vehicle, weight reduction is particularly important. Castings also require subsequent machining to form the braking surface and to form the means for attachment to the vehicle wheel. If the brake assembly is used with a heavy and/or high-speed vehicle, it is additionally desirable to provide a ventilating air flow through the rotor between the disk braking surfaces. The casting of such ventilated rotors is difficult.

It is, therefore, a principal object of this invention to provide a fabricated rotor for a disk brake assembly.

It is another object of this invention to provide a lightweight, low-cost disk brake rotor.

It is a further object of the invention to provide a fabricated, ventilated rotor for a disk brake assembly made up of a number of steel pieces.

It is yet another object of this invention to provide a fabricated, ventilated rotor assembly that facilitates the dissipation of the heat generated during braking action.

SUMMARY OF THE INVENTION

A fabricated rotor embodying this invention is particularly adapted for use in a vehicular disk brake assembly. The rotor is comprised of a hub portion that is adapted to be affixed to a vehicle wheel and a braking portion integrally connected to the hub portion. The braking portion defines at least one annular surface that is adapted to be engaged by the frictional surface of an associated brake pad for braking the rotation of the rotor and the associated wheel.

BRIEF DESCRIPTION OF THE DRAWINGS

FIG. 1 is a cross-sectional view taken through a vehicular disk brake assembly embodying the invention and showing portions of the brake assembly in phantom.

FIG. 2 is a cross-sectional view taken generally along the line 2—2 of FIG. 1.

FIG. 3 is an enlarged cross-sectional view taken along the line 3—3 of FIG. 2.

FIG. 4 is an enlarged cross-sectional view taken along the line 4—4 of FIG. 2.

FIG. 5 is an enlarged cross-sectional view taken along the line 5—5 of FIG. 2.

DETAILED DESCRIPTION OF THE PREFERRED EMBODIMENT

A disk brake assembly embodying this invention is identified generally by the reference numeral 11. The brake assembly is particularly adapted for use in automotive vehicular applications and comprises a fabricated rotor, indicated generally by the reference numeral 12, which is of the ventilated type and which defines a pair of oppositely facing annular braking surfaces 13 and 14. Brake pads 15 and 16 of a caliper assembly 17 are adapted to frictionally engage the braking surfaces 13 and 14 for braking rotation of the disk 12. The brake pads 15 and 16 may be actuated in any manner and, for this reason, the caliper assembly 17 and its actuating means will not be described in detail and have been shown only in phantom lines in the drawings.

The rotor assembly 12 is fabricated from three parts—a first member, indicated generally by the reference numeral 18; a second member, indicated generally by the reference numeral 19; and a spacer member, indicated generally by the reference numeral 21. Each of the members 18, 19 and 21 are formed from low or medium carbon steels and may be shaped by any known metal-forming technique such as stamping, forging, spinning, or the like. Steels having carbon in the range of 0.06 to 0.45 percent carbon have proven satisfactory for this application.

The member 18 is comprised of a generally radially extending hub portion 22 having a plurality of circumferentially spaced apertures 23 (only one of which appears in the drawings) to pass fastening studs 24. A central aperture 25 is formed in the hub portion 22 to accommodate a vehicular hub 26 that may be supported for rotation on a spindle (not shown) in a conventional manner. The studs 24 affix the hub 26 to the member 18 and have male threaded ends 27 so that a vehicular wheel (not shown) may be fastened to the hub 26 and rotor assembly 12.

At the outer periphery of its hub portion 22, the member 18 is formed with a dished section 28 that terminates at its outer end in a bead 29 from which a generally radially extending annular section 31 extends. The annular section 31 forms the braking surface 14 on one of its sides and has an annular surface 32 on its other side. The member 18 may be formed in a single stamping or drawing operation and the only machined surfaces formed thereon are a chamfer 33 formed at the outer periphery of the braking surface 14 and a chamfer 34 formed adjacent the central opening 25. These chamfers are provided only to remove sharp edges. Of course, the surface 14 should be free of burrs and imperfections to avoid damage to the brake pad 16. If the member 18 is formed as a stamping from a single sheet of sheet material, it will have a substantially uniform thickness in all of its sections.

The member 19 is also formed from a single piece of steel and may be formed in any known manner. The member 19 has an annular shape with the braking surface 13 being formed on one of its faces. An annular surface 35 is formed by the member 19 on the side opposite its braking surface 13. The surface 35 faces the surface 32 of the member 18 but is spaced from it by the member 21. Adjacent the outer periphery of the braking surface 13, the member 19 is formed with a chamfer 36 which is the only machined surface on the member 19. The inner periphery of the member 19 defines a relatively large opening 37 which extends radially outwardly and terminates just short of the inner extremity of the frictional lining of the brake pad 15.

The spacer member 21 is formed from a rectangular piece of strip steel and is corrugated as shown in most detail in FIGS. 2 through 5. The corrugation results in the formation of an annular shape and a number of radially extending airgaps between the braking surfaces 13 and 14, as will become more apparent as this description proceeds.

At its radial inner extremity the spacer member 21 is corrugated to provide generally axially extending walls 38 that are joined at opposite ends by generally circumferentially extending portions 39 (FIG. 3). The portions 39 engage alternately the surfaces 32 and 35 of the members 18 and 19 and the walls 38 extend generally perpendicularly between these surfaces. Thus, airgaps 41 are formed by the members 18, 19 and 21, which airgaps have a generally rectangular shape adjacent the inner periphery of the member 21. This area forms a cooling air inlet.

Progressing radially outwardly from the inner extremity of the member 21, the walls 38 commence to increase their angularity with respect to the adjacent surfaces 32 and 35 as indicated by the reference numerals 38a in FIG. 4. At the same time, the portions that engage the surfaces 32 and 35 decrease in length as indicated by the reference numeral 39a in this figure, and due to the increased angularity, a greater length of the walls 38a is disposed in the airgap. The cross-sectional area of the airgaps 41 also is greater at this point than at the inner extremity.

At the radial outer extremity of the member 21, the walls that span the members 18 and 19 are at their greatest angularity with respect to the surfaces 32 and 35, as indicated by the reference numeral 38b (FIG. 5). The portions that contact the surfaces 32 and 35 have the least area of contact at this radial position, as indicated generally by the reference numeral 39b. Hence, at the radial outer extremity of the rotor assembly 12, the airgaps 41 have the greatest cross-sectional area, the spacer member 21 has the least area of contact with the members 18 and 19, and the walls 38b have their greatest surface area disposed in the airgap.

The shape of the corrugations of the spacer member 21 described permits the spacer member to be formed from a rectangular sheet. Due to the change in shape of the corrugations as they progress radially outwardly, the corrugations will cause the member 21 to assume an annular shape. This annular shape may be formed from a rectangular piece since the length of the spacer member from its first point of contact with either member 18 or 19 until its next point of contact with the same member, moving in a circumferential direction, remains constant at all radial positions. This occurs since the length of the spacer member in contact with each member decreases as the length that spans the members increases. After the spacer member 21 is formed into its annular shape, its ends are affixed together in any known manner. In a like manner, the portions 39 may be affixed to the members 18 and 19 in any known manner, as by welding, to secure the members 18, 19 and 21 together. In addition to performing the function of bringing the member 21 into an annular shape, the shape of the corrugations form air passages that increase in cross-sectional area radially outwardly of the disk. Hence, as the heated air moves through these passages, the flow area will increase ensuring good air flow. In addition, a larger portion of the walls 38b is exposed to this air flow in a radially outward direction to improve the heat transfer from the braking surfaces 13 and 14 to the air flowing through the gaps 41. Thus, it should be readily apparent that the use of the fabricated construction made up of steel pieces permits a high strength assembly which is low in cost and which permits an accurately formed series of air passages between the braking surfaces.

What is claimed is:

1. A ventilated fabricated rotor for a disk brake assembly comprising a first member, a second member, said first and said second members defining oppositely facing annular braking surfaces each adapted to be directly engaged by a respective frictional surface of an associated disk brake pad, said first and said second members defining facing parallel annular surfaces spaced from each other, and a spacer member connected to said facing surfaces of said first and said second members for securing said first and said second members in relation to each other, said spacer member being corrugated and defining a plurality of angularly disposed walls extending between the facing surfaces of said first and said second members, said walls extending in a generally radial direction and having an angular relationship with said facing surfaces that decreases in a radially outward direction.

2. A ventilated rotor as set forth in claim 1 wherein the spacer member is formed from a flat rectangular strip of material with the corrugations being configured to give the spacer member an annular shape.

3. A fabricated steel rotor as set forth in claim 1 wherein the rotor is formed as a stamping from sheet steel.

4. A fabricated steel rotor as set forth in claim 3 wherein the steel has a carbon content in the range of 0.06 to 0.45 percent.

* * * * *

UNITED STATES PATENT OFFICE
CERTIFICATE OF CORRECTION

Patent No. 3623579          Dated 11/23/71

Inventor(s) Paul G. Hendrickson and Earl W. Elster

It is certified that error appears in the above-identified patent and that said Letters Patent are hereby corrected as shown below:

Col. 4, line 22 - After "," insert adjacent of said walls being integrally connected by circumferentially extending portions, said circumferentially extending portions being in engagement with respective of said first and second members, the area of engagement of said circumferentially extending portions with said first and second members decreasing in a radially outward direction.

Signed and sealed this 13th day of June 1972.

(SEAL)
Attest:

EDWARD M. FLETCHER, JR.       ROBERT GOTTSCHALK
Attesting Officer                Commissioner of Patents